(12) United States Patent
Langenfeld et al.

(10) Patent No.: US 6,997,839 B1
(45) Date of Patent: Feb. 14, 2006

(54) HYDRAULIC MOTOR APPARATUS

(75) Inventors: Thomas J. Langenfeld, Sullivan, IL (US); Raymond Hauser, Sullivan, IL (US); Matthew C. Roney, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 7 days.

(21) Appl. No.: 10/950,716

(22) Filed: Sep. 27, 2004

Related U.S. Application Data

(63) Continuation of application No. 10/260,969, filed on Sep. 30, 2002, now Pat. No. 6,811,510.

(60) Provisional application No. 60/407,814, filed on Sep. 3, 2002.

(51) Int. Cl.
*F16H 47/04* (2006.01)

(52) U.S. Cl. .............................................. 475/83

(58) Field of Classification Search ............... 60/458, 60/487; 91/503; 475/23, 83
See application file for complete search history.

(56) References Cited

U.S. PATENT DOCUMENTS

| | | |
|---|---|---|
| 2,599,814 A | 6/1952 | Cull |
| 2,907,230 A | 10/1959 | Kollman |
| 3,126,707 A | 3/1964 | Hann et al. |
| 3,232,172 A | 2/1966 | Ziegelmeyer |
| 3,270,826 A | 9/1966 | Middlesworth et al. |
| 3,383,930 A | 5/1968 | Hauser-Bauh |
| 3,480,156 A | 11/1969 | Pensa |
| 3,590,658 A | 7/1971 | Tuck |
| 3,686,978 A | 8/1972 | Knoblach et al. |
| 3,698,189 A | 10/1972 | Reimer |
| 3,880,017 A | 4/1975 | Miyao et al. |
| 3,920,092 A | 11/1975 | Henderson et al. |
| 3,939,824 A | 2/1976 | Arneson et al. |
| 3,942,390 A | 3/1976 | Dunn |
| 4,040,312 A | 8/1977 | Tappan et al. |
| 4,213,514 A | 7/1980 | Ehrlinger et al. |
| 4,271,725 A | 6/1981 | Takao et al. |
| 4,275,616 A | 6/1981 | Ehrlinger et al. |
| 4,431,073 A | 2/1984 | Nagao et al. |
| 4,809,796 A | 3/1989 | Yamaoka et al. |
| 4,819,508 A | 4/1989 | Yamaoka et al. |
| 4,852,463 A | 8/1989 | Wagenseil |
| 4,909,100 A | 3/1990 | Takagi et al. |
| 4,995,276 A | 2/1991 | Zaunberger |
| 5,078,222 A | 1/1992 | Hauser et al. |
| 5,368,527 A * | 11/1994 | Forster ..................... 475/83 |
| 5,386,742 A | 2/1995 | Irikura et al. |
| 5,397,281 A | 3/1995 | Forster |
| 5,398,776 A | 3/1995 | Forster |
| 5,501,640 A | 3/1996 | Hauser et al. |
| 5,528,978 A | 6/1996 | Forster |
| 5,904,043 A | 5/1999 | Nagatomo |
| 5,918,691 A | 7/1999 | Ishii |

(Continued)

FOREIGN PATENT DOCUMENTS

DE     3905292 A1    8/1990

(Continued)

*Primary Examiner*—Dirk Wright
(74) *Attorney, Agent, or Firm*—Neal, Gerber & Eisenberg LLP

(57) ABSTRACT

A hydraulic motor assembly having a motor and gear reduction set mounted in a housing. The housing may be formed of separate components, including the external surface of the ring gear and the hydraulic motor port block. The motor assembly may also include pressure relief valves or neutral valves in the motor port block and a brake assembly mounted in the port block or on the motor housing to provide braking for the output axle.

21 Claims, 17 Drawing Sheets

U.S. PATENT DOCUMENTS

| | | |
|---|---|---|
| 5,928,099 A | 7/1999 | Tsunemi |
| 5,938,558 A | 8/1999 | Eybergen et al. |
| 5,974,799 A | 11/1999 | Nakajima et al. |
| 6,109,385 A | 8/2000 | Deininger et al. |
| 6,125,630 A | 10/2000 | Abend et al. |
| 6,125,954 A | 10/2000 | Oota et al. |
| 6,152,247 A | 11/2000 | Sporrer et al. |
| 6,248,037 B1 | 6/2001 | Forster |
| 6,250,433 B1 | 6/2001 | Sealine et al. |
| 6,432,014 B1 | 8/2002 | Fujie et al. |
| 6,447,420 B1 | 9/2002 | Tanabe et al. |
| 6,508,059 B1 | 1/2003 | Takada et al. |
| 6,524,206 B1 | 2/2003 | Tsunemi et al. |
| 6,543,560 B1 | 4/2003 | Trefz et al. |
| 6,634,445 B1 | 10/2003 | Dix et al. |
| 6,811,509 B1 * | 11/2004 | Langenfeld et al. .......... 475/83 |
| 6,811,510 B1 * | 11/2004 | Langenfeld et al. .......... 475/83 |
| 6,840,879 B1 * | 1/2005 | Langenfeld et al. .......... 475/83 |

FOREIGN PATENT DOCUMENTS

| | | |
|---|---|---|
| JP | 61229615 A | 10/1986 |
| JP | 05079563 A | 3/1993 |
| JP | 00009023 | 1/2000 |

* cited by examiner

HYDRAULIC MOTOR APPARATUS

CROSS REFERENCE TO RELATED APPLICATION

This application is a continuation of U.S. patent application Ser. No. 10/260,969, filed Sep. 30, 2002, now U.S. Pat. No. 6,811,510 which claims the benefit of U.S. Provisional Patent Application Ser. No. 60/407,814, filed Sep. 3, 2002, and both of which are incorporated herein by reference in their entirety.

BACKGROUND OF THE INVENTION

This invention relates to hydraulic or hydrostatic motors for use in vehicles, industrial applications or other applications.

SUMMARY OF THE INVENTION

This invention discloses a hydraulic motor assembly having a housing in which the hydraulic motor, output axle and gear reduction set are mounted. This invention may be used in a variety of industrial and vehicle applications, especially those vehicles where a wheel motor is used. The invention also discloses the use of pressure relief valves and neutral valves in the hydraulic motor assembly.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
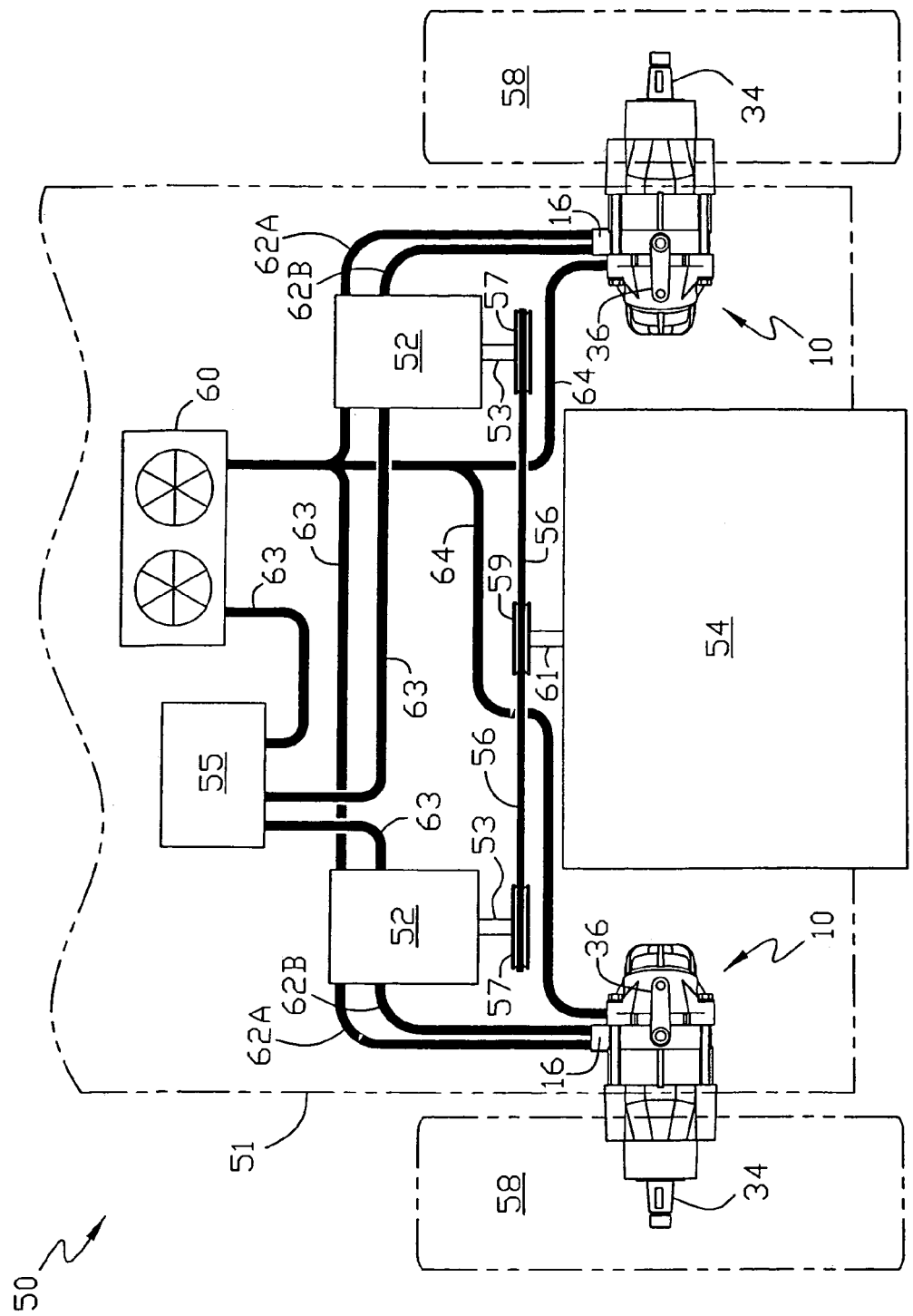
FIG. 1 is a top partial schematic view of a vehicle incorporating the present invention.
Figure 2:
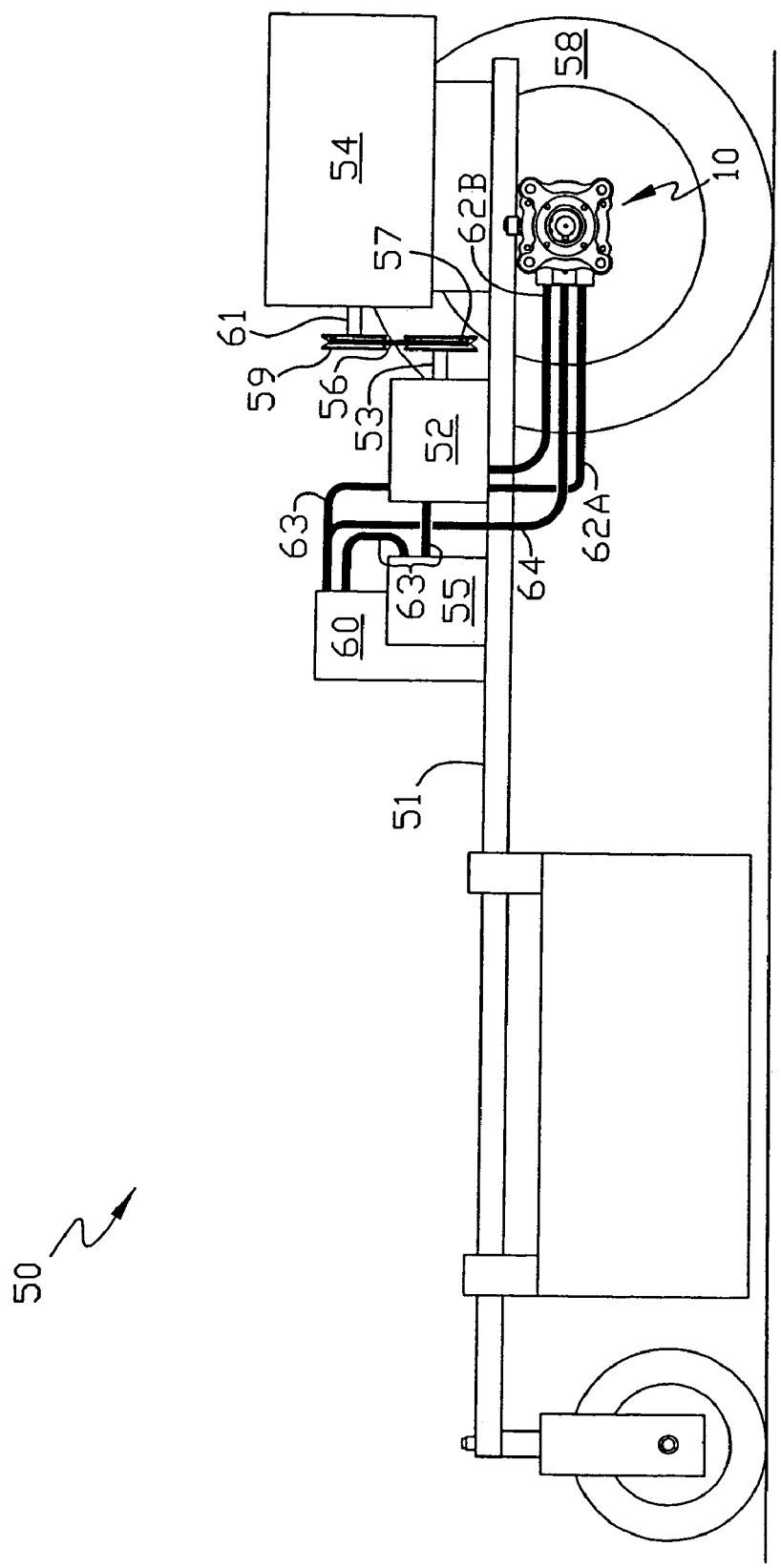
FIG. 2 is a side schematic view of the vehicle incorporating the present invention.

The vehicle 50 depicted schematically in FIGS. 1 and 2 is a zero turn vehicle using the two motor assemblies 10 as wheel motors to drive a pair of wheels 58. In FIG. 2, only one motor assembly 10 is shown for clarity. Vehicle 50 is powered by a prime mover such as engine 54, which drives pulley 59 through engine output shaft 61. A pair of pumps 52 are mounted on vehicle frame 51 in some known manner. Pump input shafts 53 are driven by pulleys 57 engaged to a belt 56 which are in turn driven by engine pulley 59. Pumps 52 are preferably of the axial piston design such as the Hydro-Gear BDP-10A, but other pump designs could also be used herewith. Hoses 62A and 62B are used to connect pumps 52 to inlets 16A and 16B of motor assembly 10. Reservoir 55 and optional oil cooler 60 are also connected to pumps 52 through a plurality of hoses 63 and 64 in the manner shown. Other arrangements could be used depending on factors such as vehicle size.

As is known in the art during operation of vehicle 50, one of hoses 62A or 62B will be under high pressure, and the other will be under low pressure or vacuum pressure, depending on the direction of actuation of pump 52, and this can be changed to change the speed and direction of output axle 34.

FIGS. 3–6 show a first embodiment of the motor assembly of this invention. In this embodiment, the external casing or housing for the assembly 10 comprises axle housing 1, motor housing 2 and the external surfaces of ring gear 23 and port block 15. A plurality of bolts 14 are used to secure axle housing 1 to motor housing 2, thus sandwiching the other elements between them. Port block 15, which may also be referred to as a port plate, may include a plurality of tabs 33 to aid in alignment and orientation with motor housing 2 during assembly. Ring gear 23 may also include a plurality of tabs 43 to aid in alignment of ring gear 23 with axle housing 1 and port block 15 during assembly.

An axial piston style hydrostatic motor 8 is mounted in motor housing 2; motor 8 comprises a plurality of pistons 5 and corresponding springs 4 and thrust washers 6 mounted in rotatable cylinder block 3. While the preferred embodiment is depicted as an axial piston motor, other styles of hydraulic motors could be used within this invention. In this embodiment, pistons 5 engage thrust bearing 7 which in turn is mounted in motor housing 2. Pistons 5 are of the spherically-shaped nose, and are often referred to as "bull pistons." Motor cylinder block 3 is rotatably mounted on a running surface 12 formed on port block 15 and drives motor output shaft 13. Bearings 9A and 9B, which are preferably needle bearings, are used to support motor shaft 13 within motor housing 2 and port block 15, respectively. A pair of hydraulic ports 29A and 29B are formed in port block 15 to hydraulically connect motor cylinder block 3 with inlets 16A and 16B through kidneys. Port block 15 includes at least two inlets 16A and 16B and an opening 32 to permit motor shaft 13 to pass therethrough. As is known, the rotational speed and direction of motor shaft 13 will depend on the input to inlets 16A and 16B. Port block 15 is preferably made of cast iron, although other materials such as aluminum or the use of a separate valve plate would also be acceptable.

Figure 3:
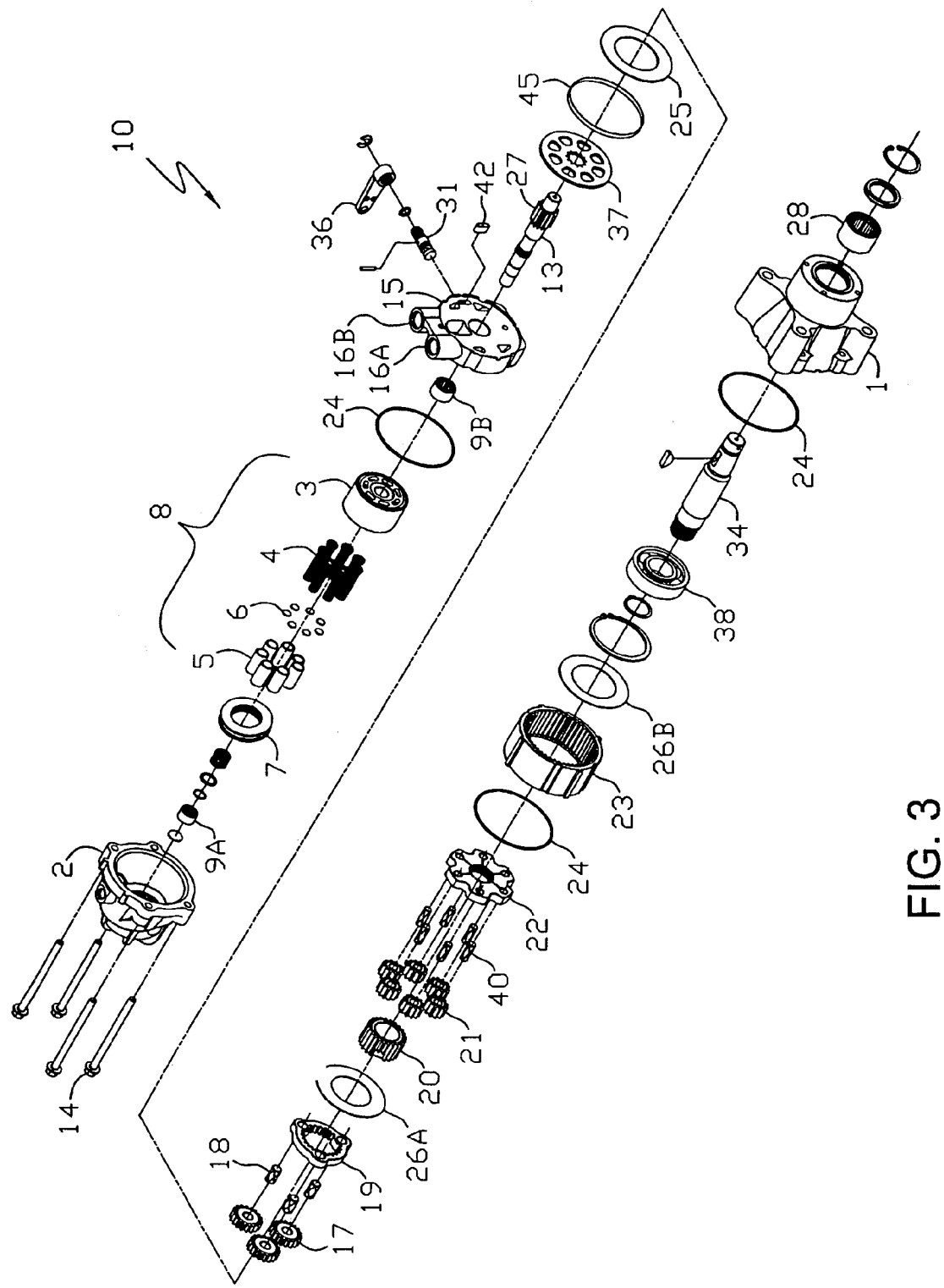
FIG. 3 is an exploded view of the hydraulic motor assembly of the present invention.

This invention uses a dual planetary reduction system, although it will be understood that other gear reduction systems could be used in the spirit of the invention. Carrier pins 18 are mounted in primary planet carrier 19, and planet gears 17 are mounted on their respective pins 18. As is known in the art, washers 26A and 26B and O-rings 24 are used as needed; FIG. 3 depicts various other retaining rings, springs and the like that would be typical in such an assembly.

Motor shaft 13 has a gear form 27 integrally formed thereon; it will be understood that this gear form 27 could also be a separate gear fixed to shaft 13. Gear form 27 engages and drives primary planet gears 17, which in turn cause rotation of carrier plate 19. Sun gear 20 is engaged to the inner teeth of carrier plate 19 and transfers the rotational force through to secondary planet gears 21, which in turn are mounted on pins 40 mounted on secondary carrier 22.

As noted above, ring gear 23 also functions as part of the overall external housing for motor assembly 10 and provides an internal running surface for primary planet gears 17 and secondary planet gears 21. Port block 15 can also serve as part of the external housing, as port block 15 and ring gear 23 are sandwiched between axle housing 1 and motor housing 2. This arrangement, while not necessary to use the invention, reduces the amount of materials needed and the overall costs of the unit. The size of axle housing 1 and/or motor housing 2 could be increased to mount these elements internally.

Axle shaft 34 is supported in axle housing 1 by means of a needle bearing 28 and ball bearing 38 and is drivingly mated to secondary planet carrier 22. Thus, the rotational torque of motor shaft 13 is increased through the two sets of planetary gears 17 and 21.

It is understood that the shape of port block 15 is not essential, although there are benefits to the shape shown in FIGS. 3–6, such as reduced cost, as noted herein. This element can also be referred to as a center section, end cap, plate or the like. A first drain passage 44 permits oil to flow from inside motor housing 2 to ring gear 23 and the rest of the assembly. A second drain passage 46 is also formed in port block 15 and permits oil to drain from the system through case drain 48 formed in motor housing 2. Hose 64 connects case drain 48 to reservoir 55 by way of optional oil cooler 60.

An alternative embodiment of the port plate is shown in FIGS. 7 to 11, which shows port block 115 including optional pressure relief valves 35A and 35B, and wherein identical reference numerals indicate structure that is identical or substantially identical to that described for other embodiments. This feature is optionally used with the other features disclosed herein, or on its own. As shown in FIGS. 7 to 11, port block 115 includes a pair of pressure relief valves 35 mounted in hydraulic ports 29A and 29B, respectively, and opposite to inlets 16A and 16B. The embodiment would also include drain passages, such as drain passage 146. The relief valve 35 described herein is designed to close slowly after opening; it will be understood by one of skill in the art that other relief valve designs can be used in this design.

Figure 10:
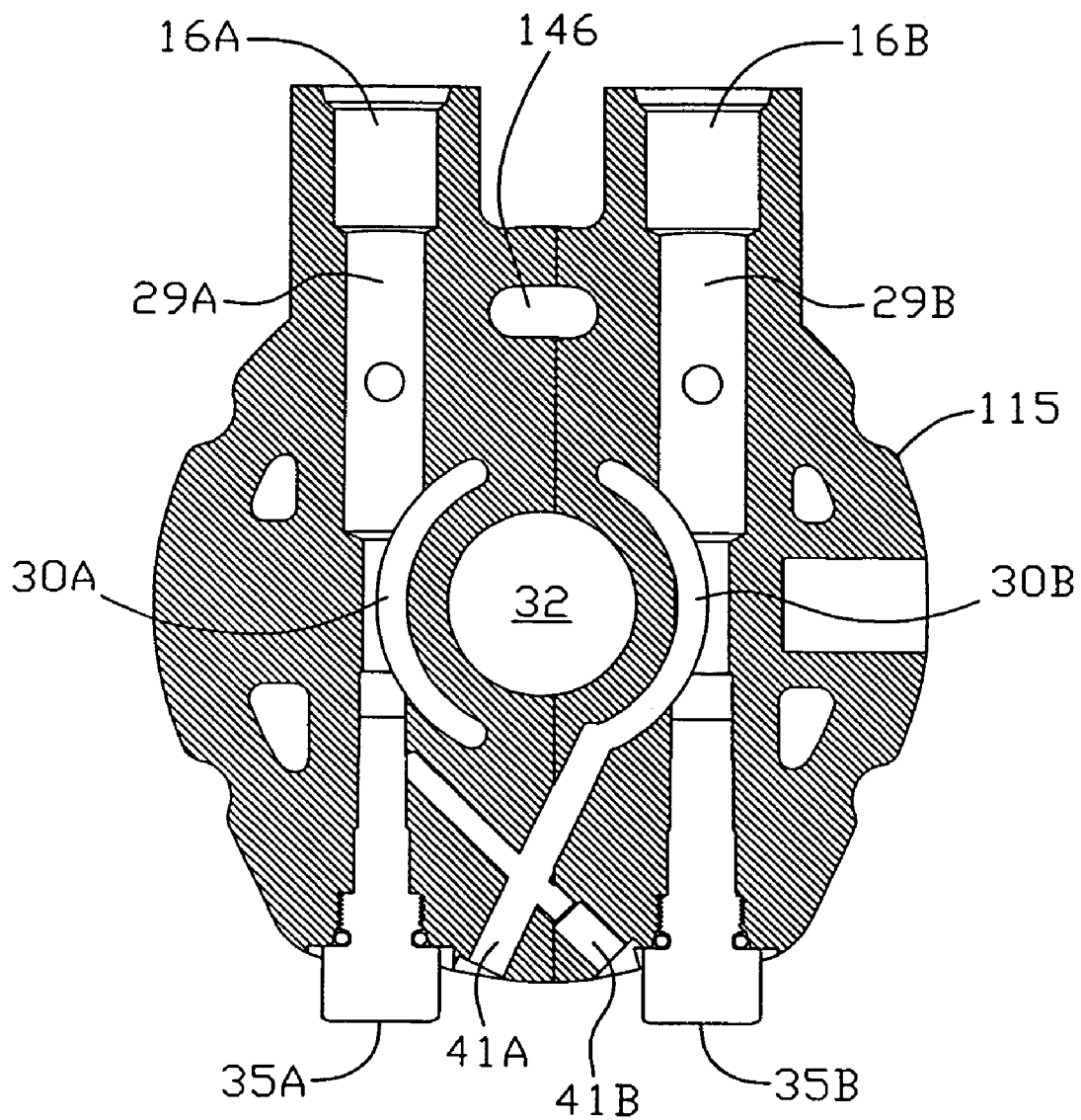
FIG. 10 is a cross-sectional view of the second embodiment of the port plate, along the line 3—3 in FIG. 7.
Figure 11:
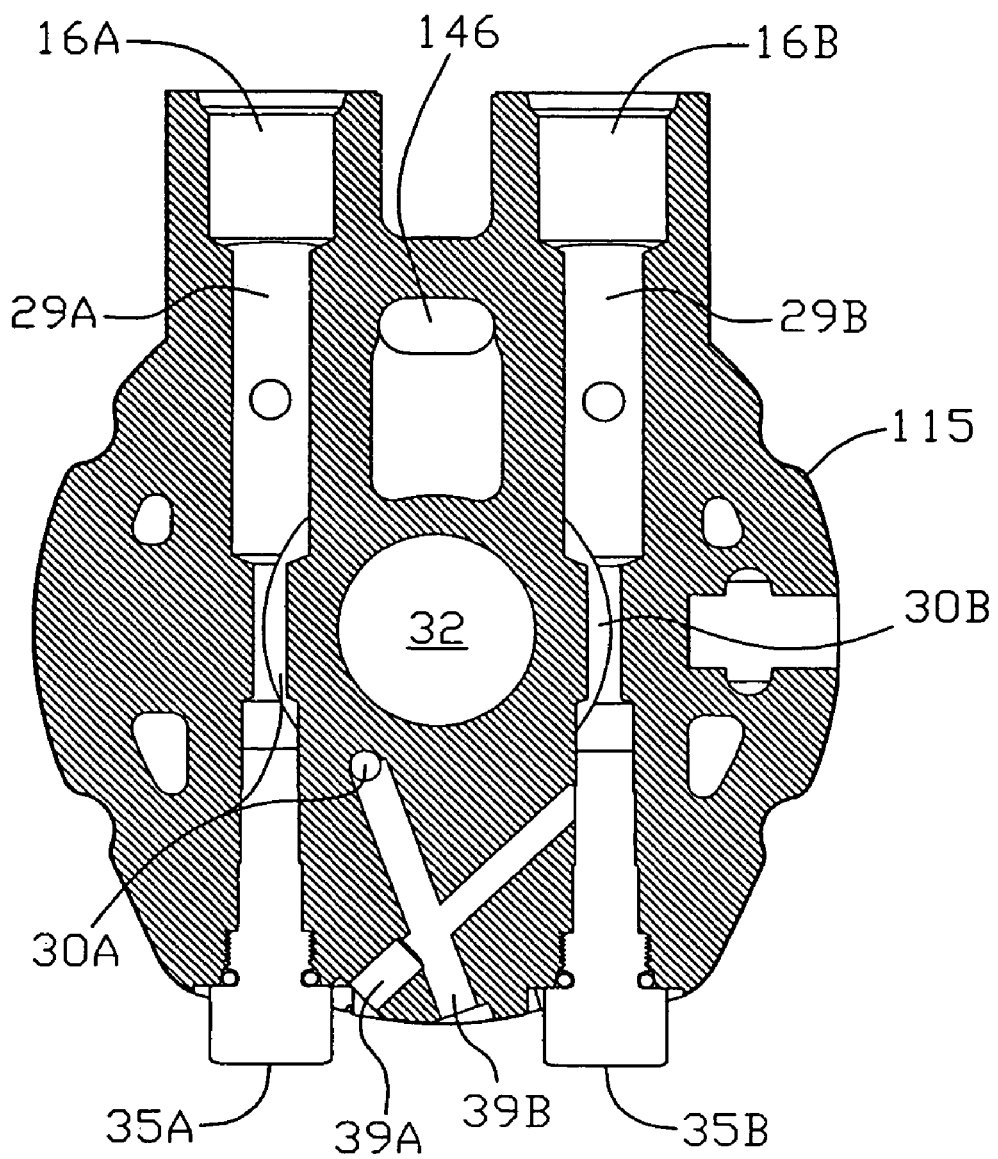
FIG. 11 is a cross-sectional view of the second embodiment of the port plate, along the line 4—4 in FIG. 7.
Figure 12:
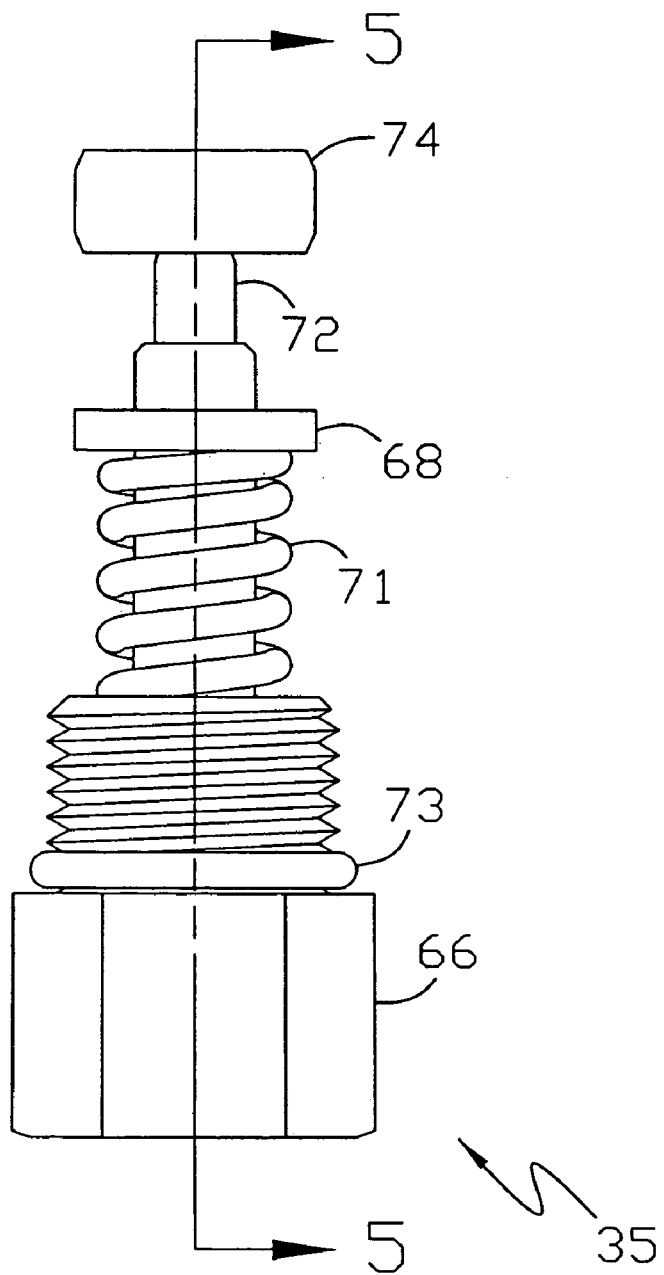
FIG. 12 is a plan view of the relief valve shown in FIGS. 7 to 11.
Figure 13:
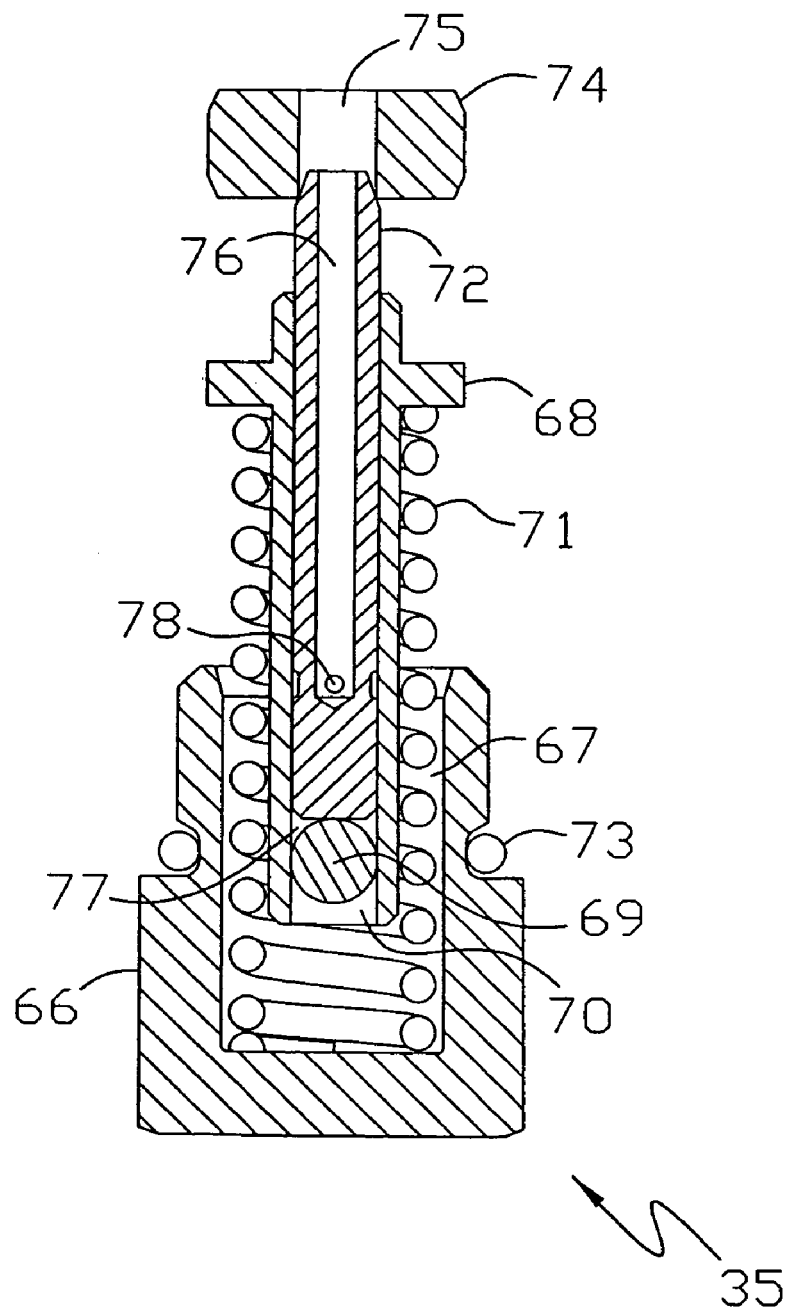
FIG. 13 is a cross-sectional side view of the valve along the line 5—5 in FIG. 12.

Pressure relief valve 35A, which can be identical to valve 35B, is shown in more detail in FIGS. 12 and 13. FIGS. 10 and 11 show valves 35A and 35B schematically to avoid confusion caused by the differing cross-sectional perspectives.

Pressure relief ports 39A, 39B, 41A and 41B are formed in port block 115. Looking at FIG. 10, which is a cross-sectional view along the lines 3—3 in FIG. 7, it should first be noted that line 3—3 is not straight, but rather breaks to pass through the center of both ports 41A and 41B, as port 41B is slightly offset higher than port 41A in the end view shown in FIG. 7. When hydraulic port 29A and kidney 30A are under high pressure, hydraulic port 29B and kidney 30B are under low pressure, and the oil pressure in port 29A causes valve 35A to open. The rate at which valve 35A opens and closes can be set through design changes such as the spring constant of spring 71 and the diameters of bore 76 and bleed orifice 78.

When valve 35A opens, oil will flow from port 29A into relief port 41B, and then to relief port 41A and on to low pressure kidney 30B. As can be seen in FIG. 11, the same dampening action will occur when port 29B and kidney 30B are under high pressure, as valve 35B will open to connect port 29B to relief ports 39A and 39B, and then to low pressure kidney 30A. This pressure relief acts to dampen the response of motor cylinder block 3 to sudden increases in pressure in the system to smooth out operation of the vehicle; placing the relief valves in the motor port block 115 instead of in the pump increases their effectiveness, as the dampening is moved closer to the ultimate output of the system, i.e., axle shaft 34.

As shown most clearly in FIG. 13, one of the valves 35A or 35B, designated here as valve 35, consists of a valve body 66 which uses an O-ring 73 to prevent leakage out of the system. Spring 71 is mounted in bore 67 of valve body 66, and engages outer plunger or cylinder 68. A center piston 72, which has an inner bore 76, is mounted in inner bore 70 of outer cylinder 68. Ball 69 is pressed into inner bore 70 at one end thereof. A separate seat 74 is pressed into hydraulic port 29 to a measured depth, or to a stop formed therein, and includes an opening 75 formed therein. Seat 74 could also be integrally formed with block 115. Ball 69 could be replaced by other shapes or a functionally equivalent feature could be integrally formed in outer cylinder 68.

Valve 35 is shown in the closed position in FIG. 13. As the oil pressure outside seat 74 increases, oil will flow through seat opening 75 into bore 76 of piston 72. The force of piston 72 against ball 69 will move cylinder 68 in the axial direction away from seat 74 compressing spring 71, thus opening valve 35 and permitting high pressure oil to pass into the bypass porting as described above. Oil will also pass through bleed orifice 78 to the area 77 adjacent ball 69 inside bore 70. As the oil pressure in area 77 increases, it increases pressure on piston 72, forcing piston 72 to move axially away from ball 69 to the point where it again engages seat 74 and closes valve 35.

Figure 17:
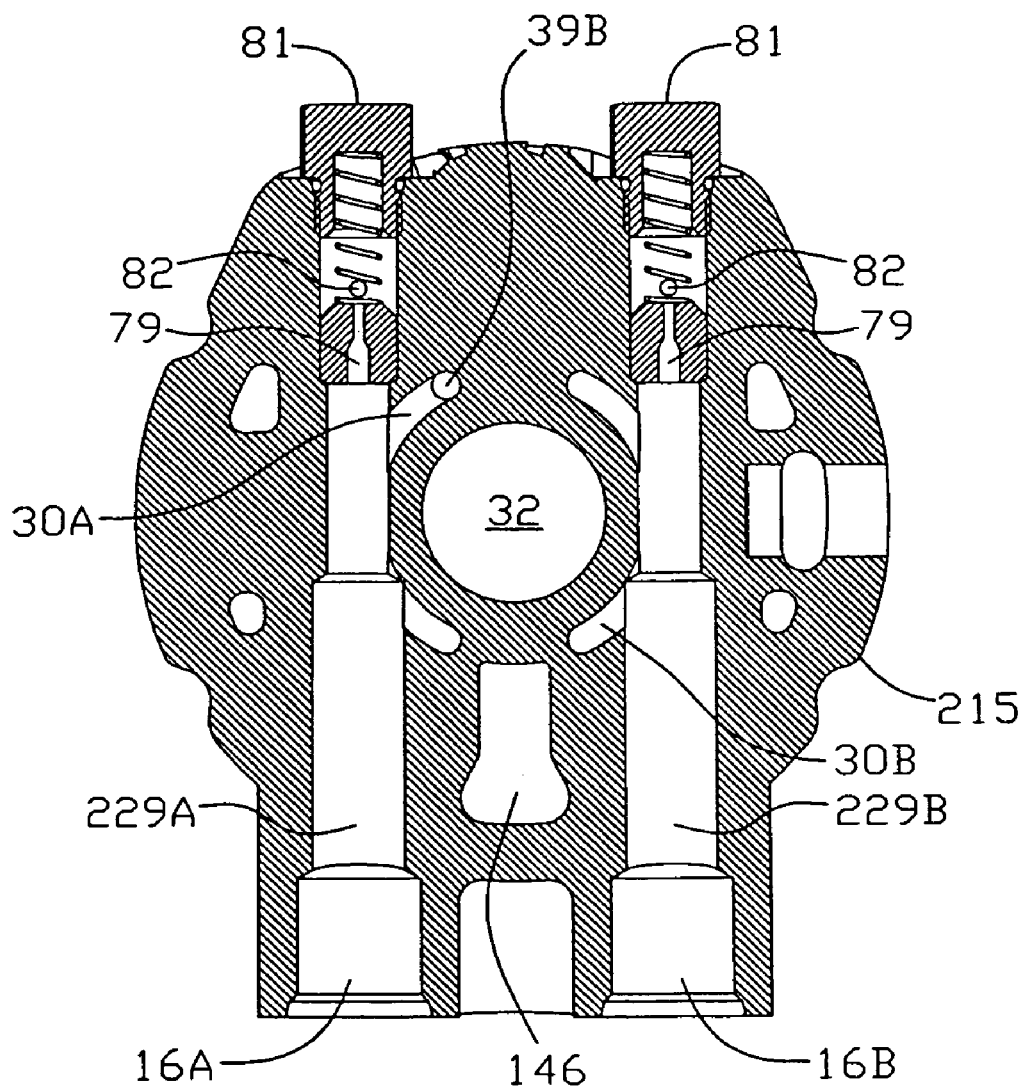
FIG. 17 is a cross-sectional view of another embodiment of the port plate.

Another benefit of this invention is that the design taught herein enables the user to locate neutral valves in the motor port block for applications where such valves may be desired. Neutral valves are known in hydraulic applications but generally have been located in hydraulic pumps or, in an integrated hydrostatic transmission, in the center section connecting the pump and the motor. FIG. 17 shows another embodiment of this invention, similar to that shown in FIG. 8, where neutral valves 81 are mounted in port plate 215; except as described herein, other elements of port plate 215 can be identical to those of port plate 115 described with regard to FIG. 8.

Neutral valves 81 may be generally identical in construction and are mounted in hydraulic ports 229A and 229B. In the position shown, oil passes through passages 79 formed in valves 81 to openings 82 formed in ports 29A and 29B, to permit the hydraulic oil to drain to case. As system pressure in ports 229A and 229B increases, the valves will close.

Figure 4:
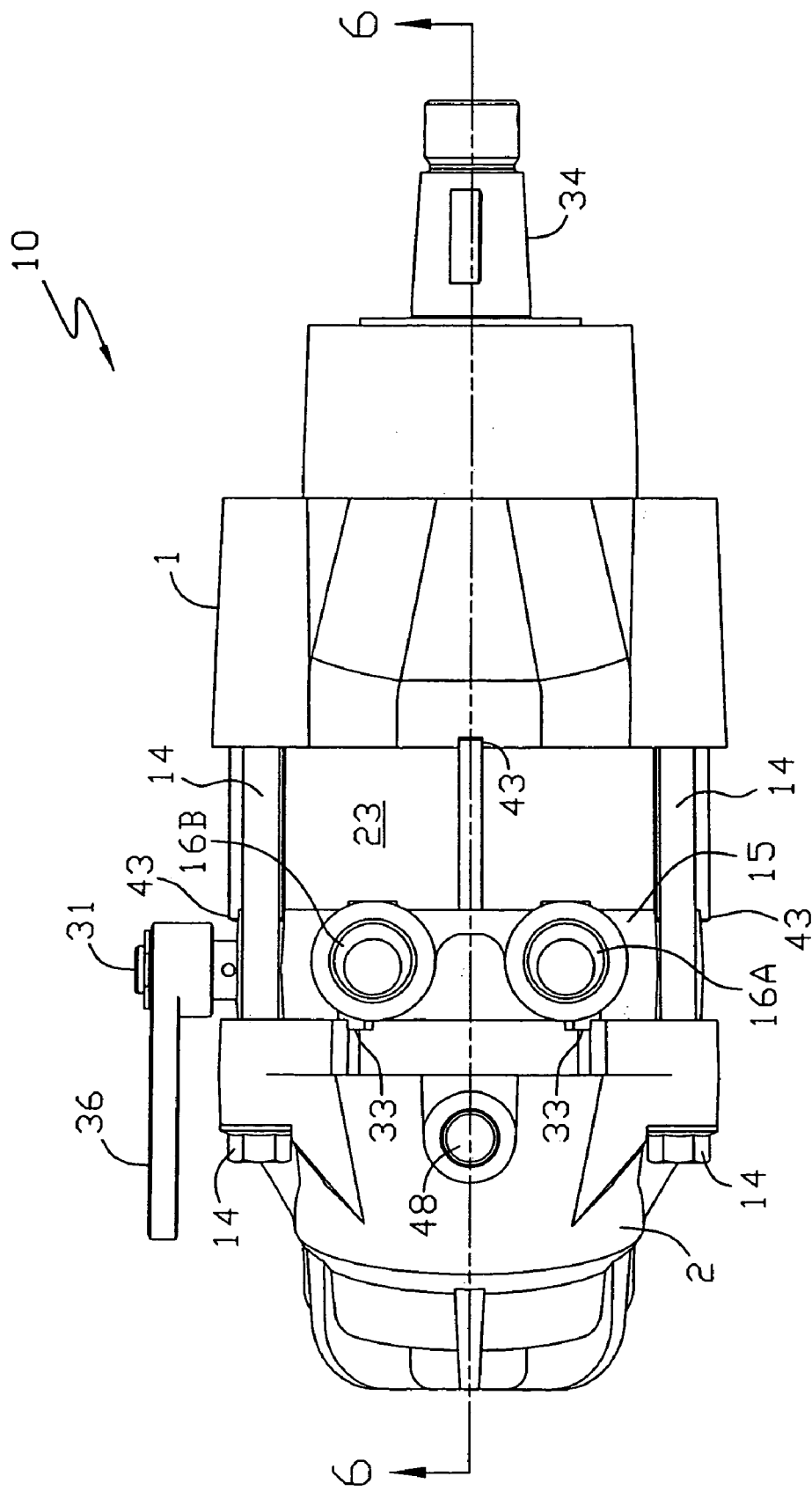
FIG. 4 is a plan view of the hydraulic motor assembly shown in FIG. 3.
Figure 5:
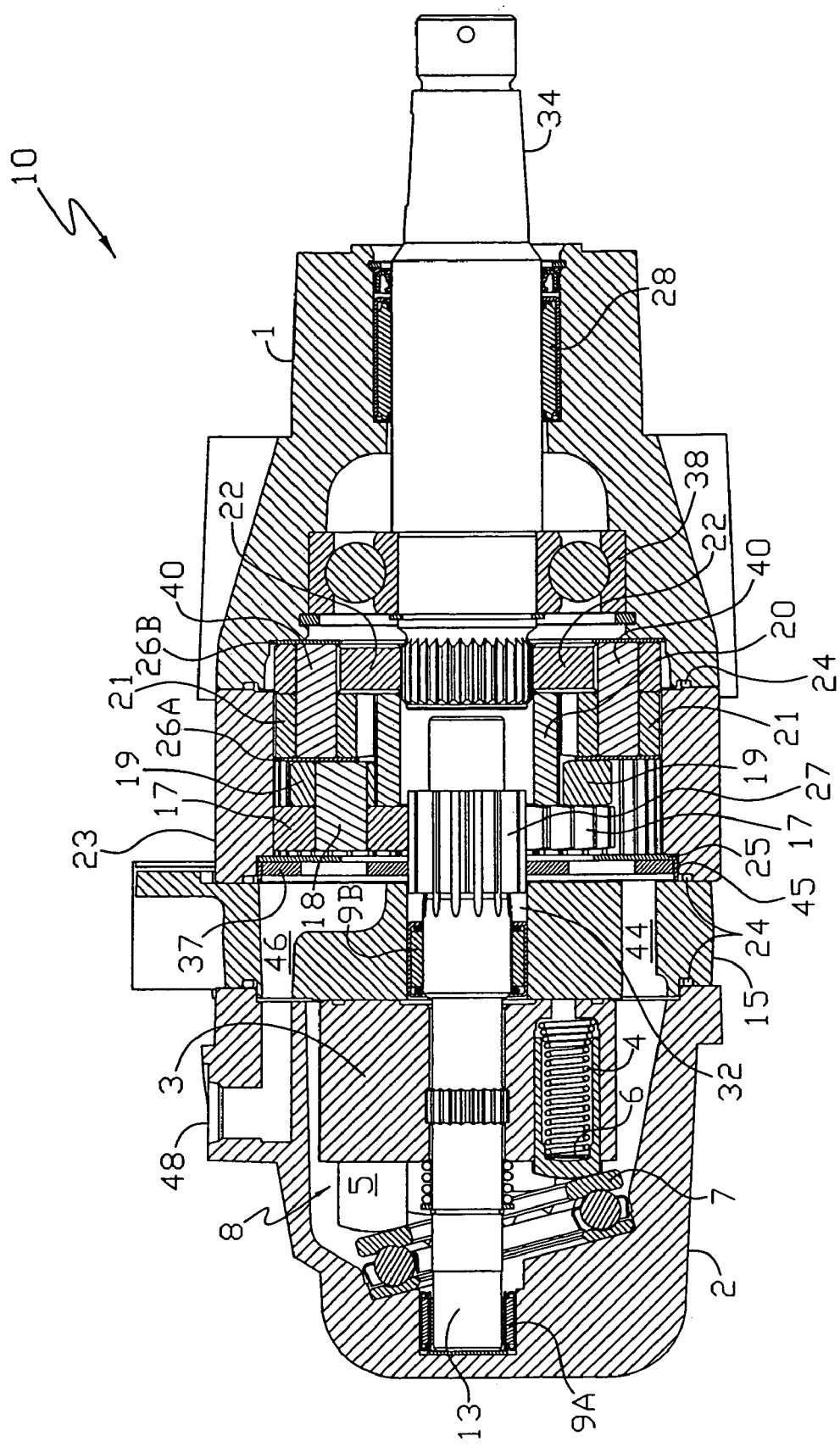
FIG. 5 is a cross-sectional side view of the hydraulic motor assembly shown in FIG. 3 along the lines 6—6 in FIG. 4.
Figure 6:
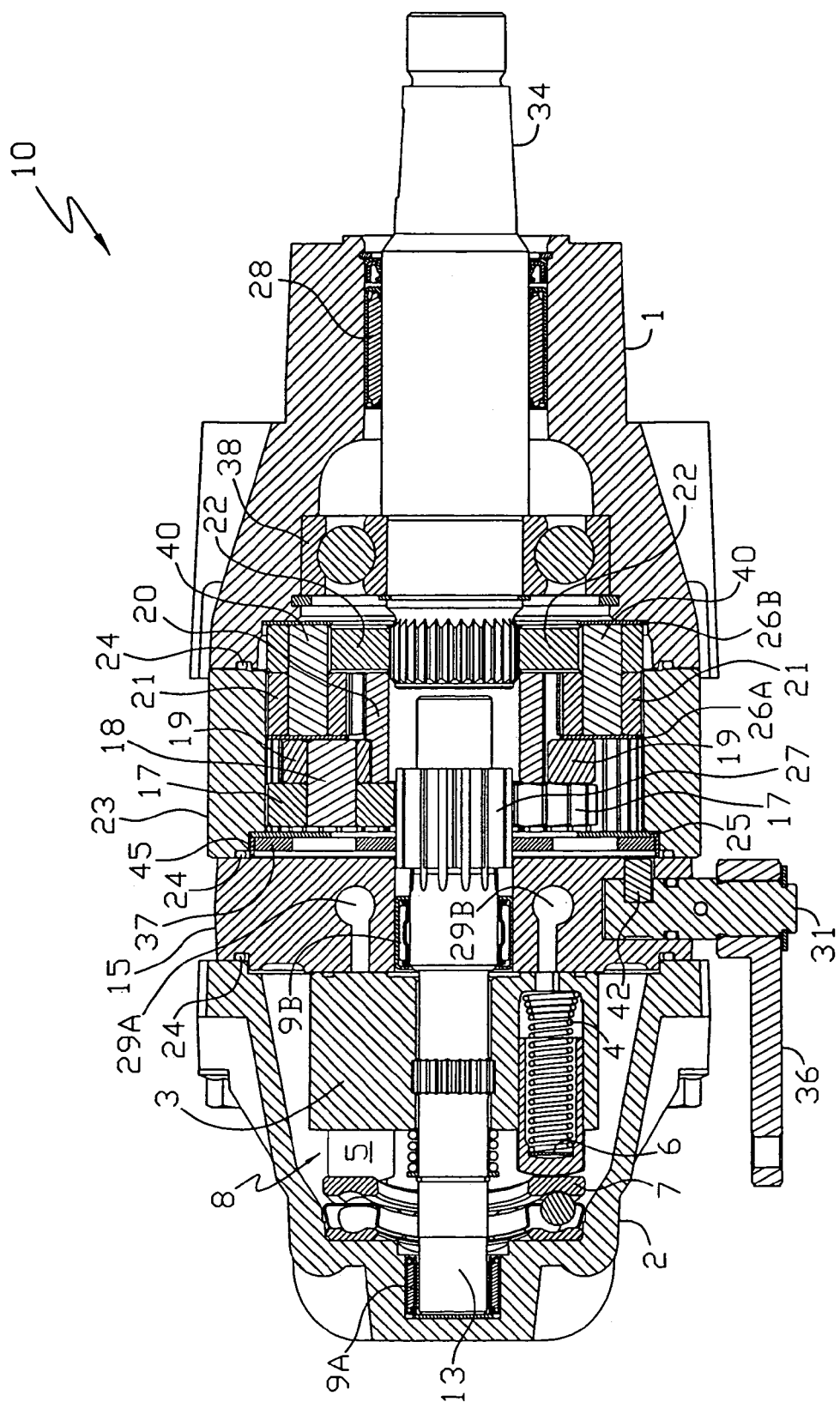
FIG. 6 is a cross-sectional side view of the hydraulic motor assembly shown in FIG. 4, with the cross-section taken in the plane of the page of FIG. 4, through the center line of the shafts.
Figure 7:
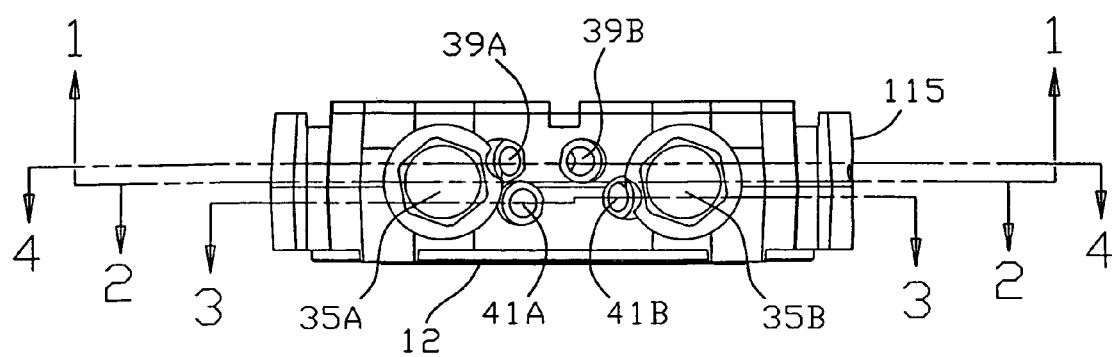
FIG. 7 is an end view of a second embodiment of the port plate of the present invention.
Figure 8:
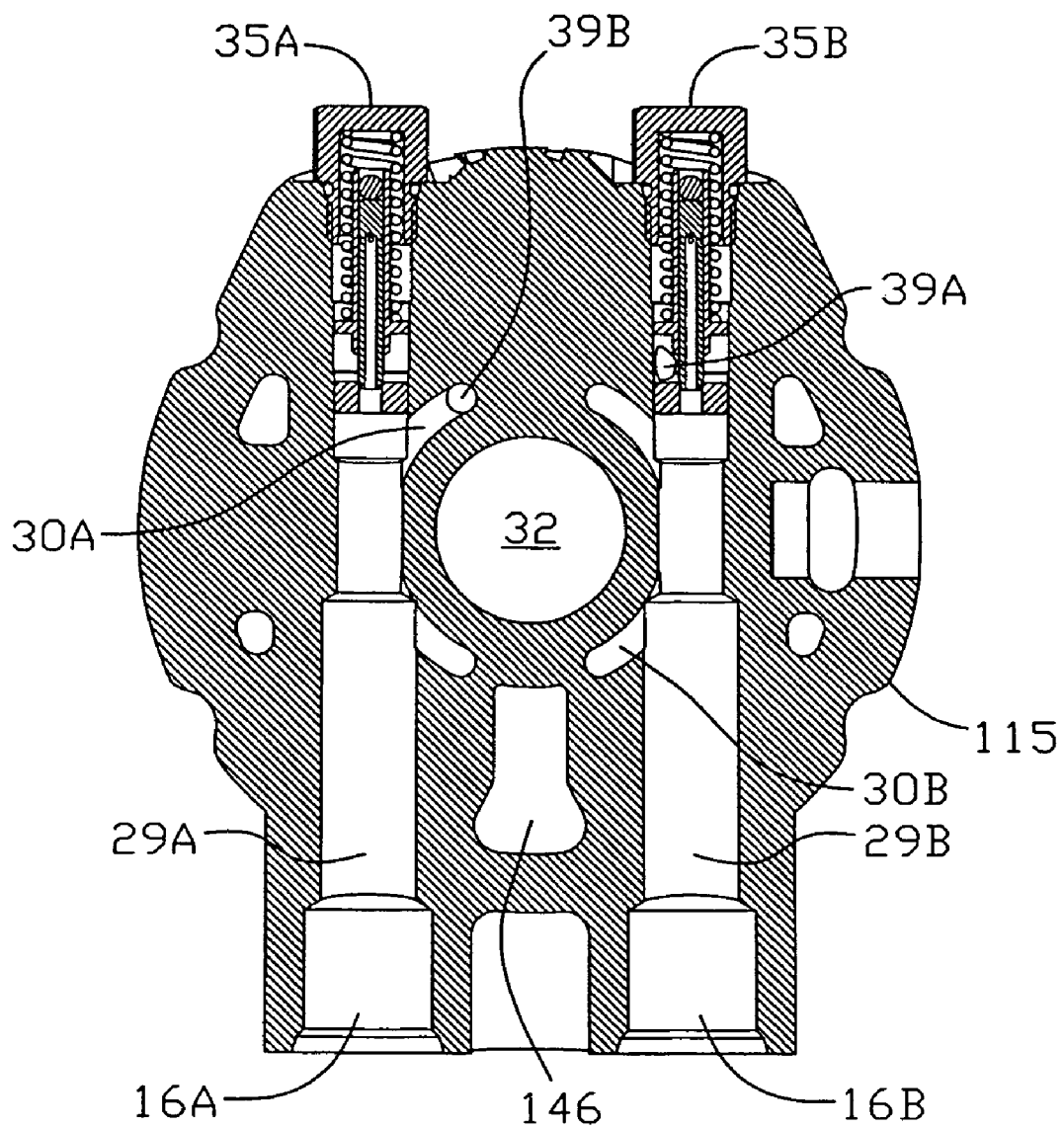
FIG. 8 is a cross-sectional view of the second embodiment of the port plate, along the line 1—1 in FIG. 7.
Figure 9:
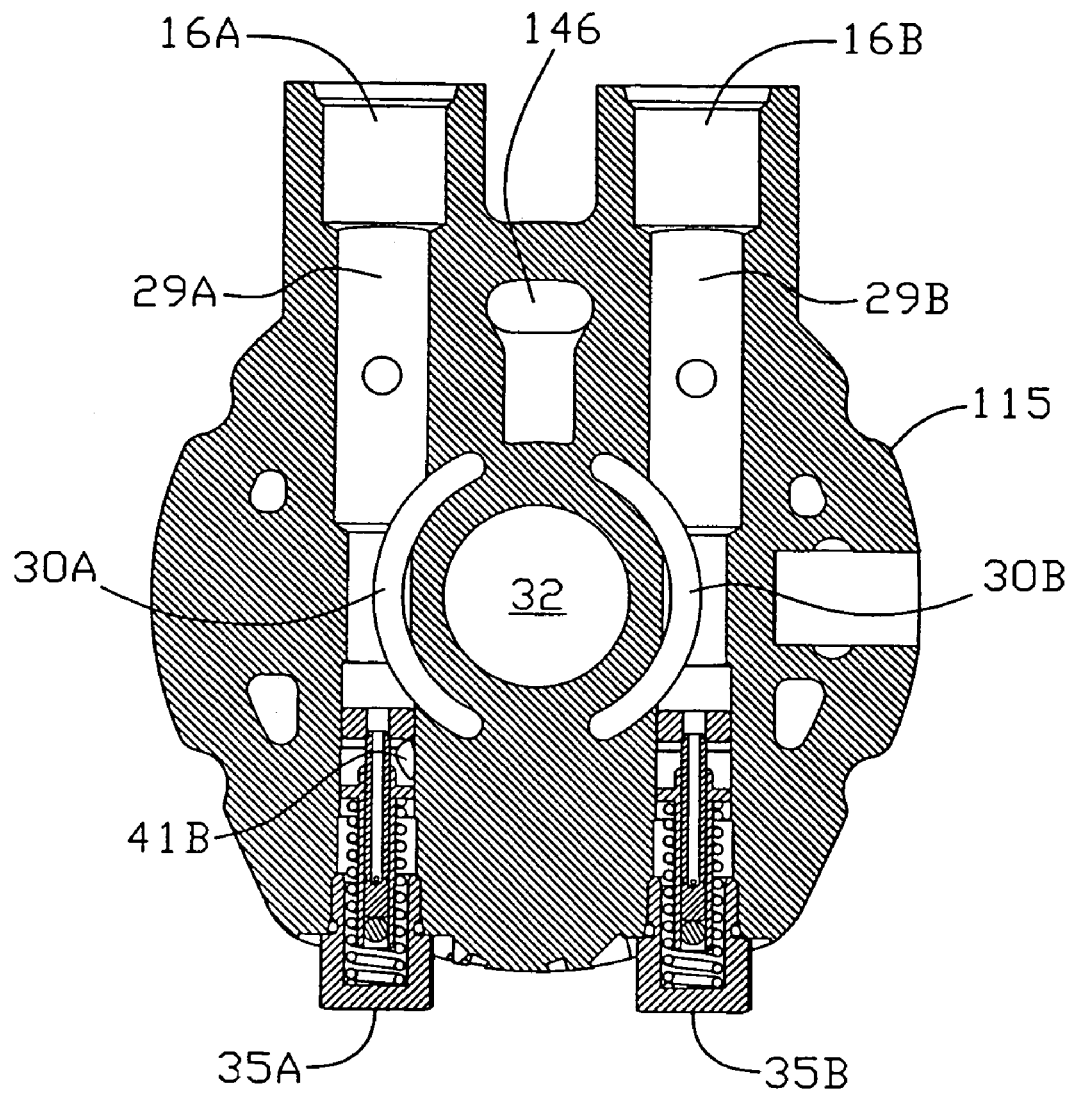
FIG. 9 is a cross-sectional view of the second embodiment of the port plate, along the line 2—2 in FIG. 7.

It is often desirable, though not necessary, to include a brake on such a motor. A first brake design is shown in FIGS. 3, 4 and 6, where a brake cam 31 and puck 42 are mounted inside port block 15. Handle 36 is secured to cam 31 and may be rotated by means of an actuation mechanism (not shown). Puck 42 has a first, disengaged, position as shown in FIG. 6. Rotation of cam 31 will cause puck 42 to move against and engage brake rotor 37, which is drivingly attached to output shaft 13, which in turn will force stator 25 against the end of ring gear 23 to brake the gear train. Spacer 45 fits around the outer diameter of brake rotor 37 and is used to prevent brake stator 25 from being pushed into rotor 37 and thus port block 15 when the brake is disengaged.

Figure 14:
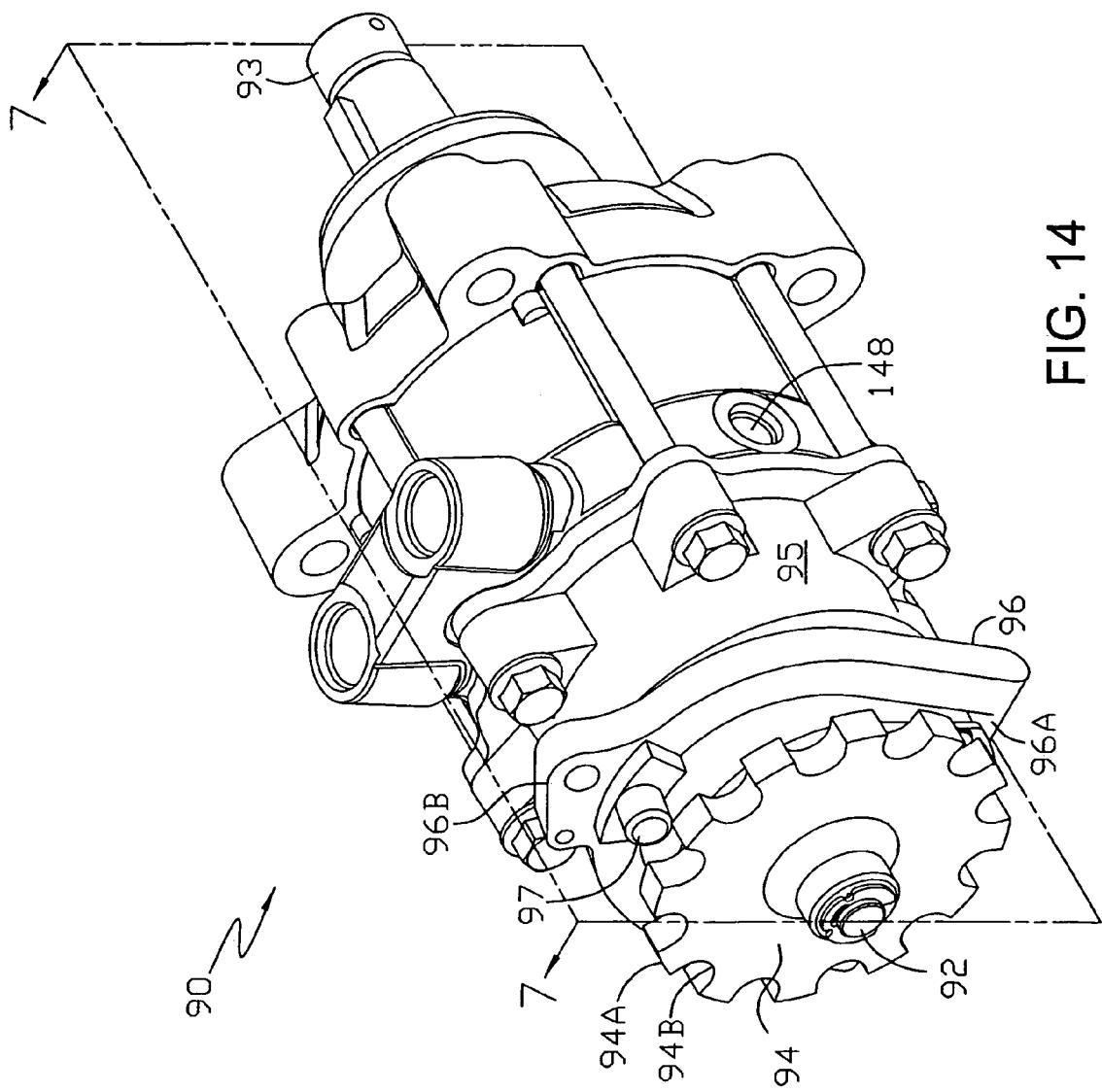
FIG. 14 is a perspective view of another embodiment of this invention.
Figure 15:
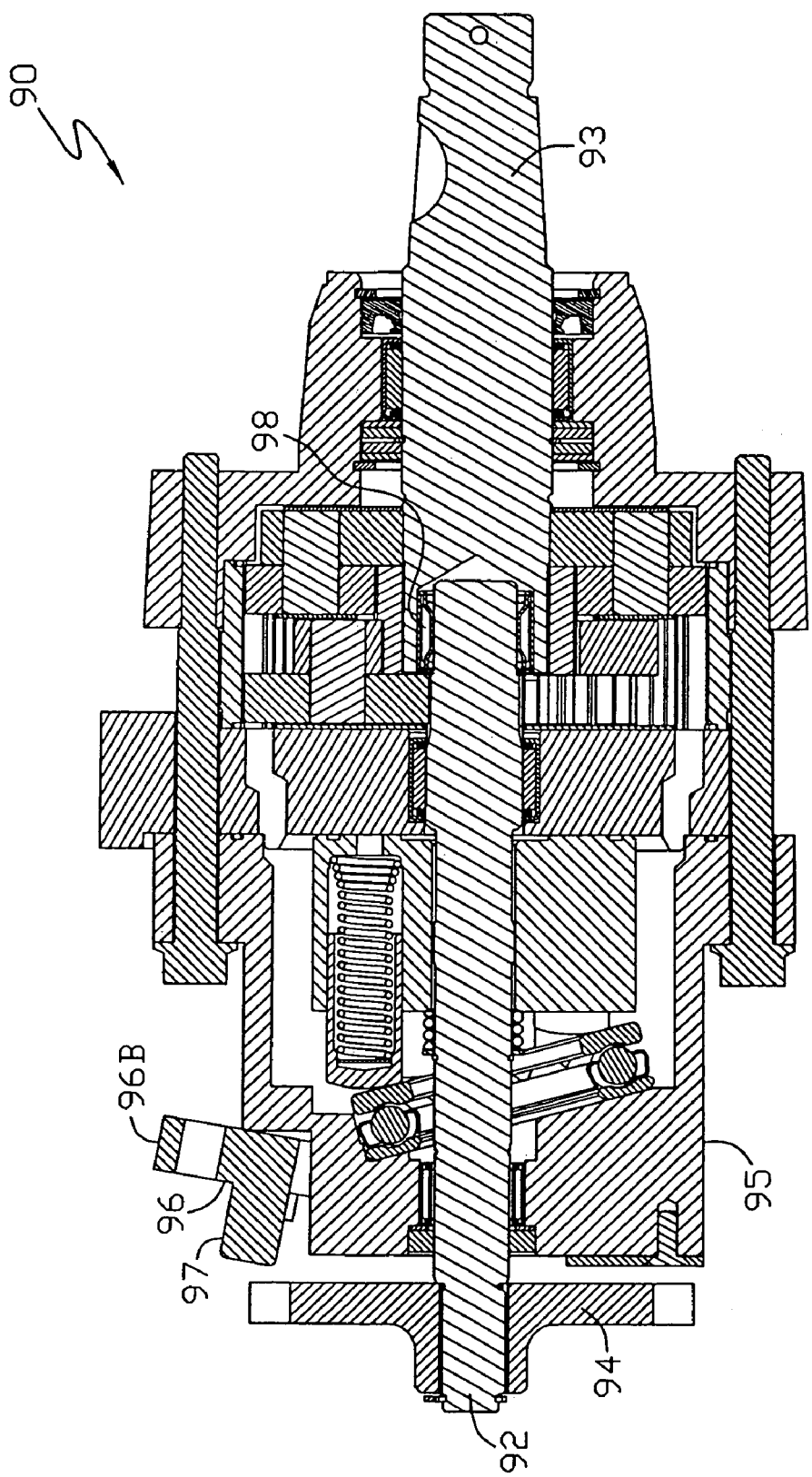
FIG. 15 is a cross-sectional side view along the line 7—7 in FIG. 14.
Figure 16:
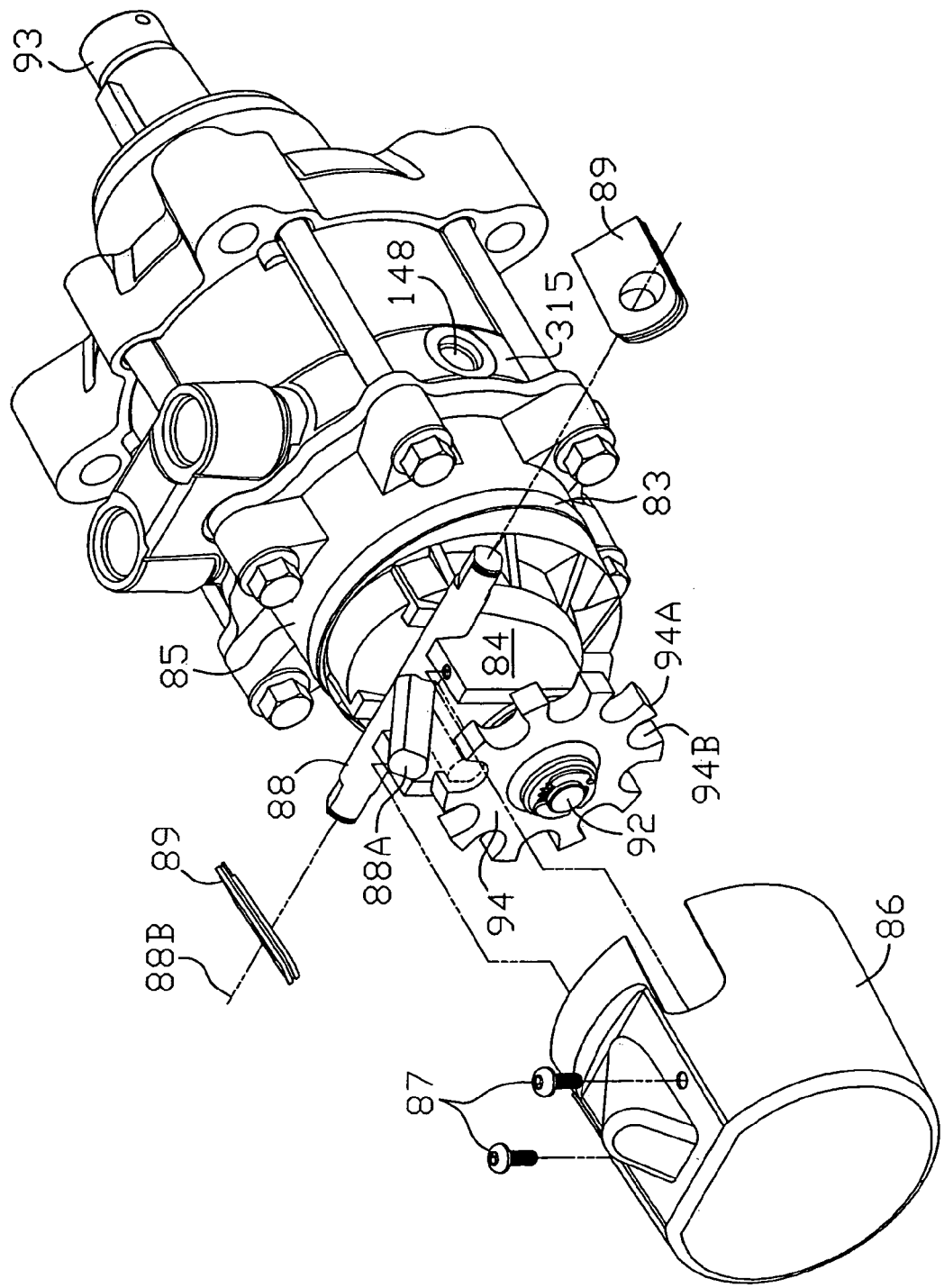
FIG. 16 is a perspective view of another embodiment of this invention.

Further embodiments of the brake mechanism are shown in FIGS. 14–16. For example, FIGS. 14 and 15 show motor assembly 90 having a motor shaft 92 extending out of motor housing 95 and having a cog 94 secured thereto and which rotates with motor shaft 92 and has a plurality of teeth 94A and openings 94B. Handle 96 is actuated to engage cog 94 through the use of tab 97. Handle 96 is of a horseshoe design and rotates about the base 96A about an axis perpendicular to the longitudinal axes of motor shaft 92 or axle 93. A tab or other similar structure 96B is formed at the top thereof (or the side opposite the axis of rotation) to engage an actuation mechanism (not shown) to rotate the horseshoe handle 96 from the disengaged position, as shown in FIG. 14, to an engaged position where tab 97 is engaged with one of the openings 94B of cog 94, thus providing braking of motor shaft 92. FIG. 14 also shows case drain 148 located in port block 315, positioned on a side away from the inlets 16A and 16B. Another embodiment of this configuration would have case drain 148 positioned on the port block 315 on the opposite side from inlets 16A and 16B.

A further embodiment of the brake mechanism is shown in FIG. 16, which also has cog 94 mounted on motor shaft 92. The size and shape of cog 94, and its teeth 94A and openings 94B, will depend to a great extent on the size of the assembly, intended loads and similar factors, and may be adjusted accordingly. In FIG. 16, motor housing 85 is shaped to receive an optional cup-shaped cover 86, which may be secured thereto through screws 87 or similar means to bracket 84. A T-bar handle 88 having an engagement member 88A is mounted in bracket 84 and is rotatable about its longitudinal axis 88B from the disengaged position shown in FIG. 16 to the engaged position shown in dashed lines in FIG. 16. Cap 86 acts to locate T-bar handle 88, and gasket 83 and grommets 89 act to seal cap 86 from the outside environment.

The engagement of T-bar handle 88 to cog 94 provides braking force to motor shaft 92 and thus brakes the entire assembly. T-bar handle 88 is rotated into or out of the engaged position through an actuation mechanism (not shown) which would attach to the ends of T-bar handle 88. Other known actuation mechanisms could be used depending on the layout of the vehicle or other application where the assembly is to be used.

It is further envisioned that a spring (not shown) may be provided to maintain the engagement of handle 96 or handle 88, and the aforementioned brake actuation mechanism would thus act to disengage the brake to allow vehicle movement.

A further benefit of the design shown in FIG. 15 is that axle shaft 93 in this embodiment also extends to and is supported by motor shaft 92, through bearing 98. This shaft design is an optional feature and can be used with the brake design shown in FIG. 15 or any of the other embodiments described herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hydraulic motor assembly having an external casing, comprising:
   a motor housing forming a part of the external casing and having a hydraulic motor mounted therein;
   an axle housing secured to the motor housing and forming a part of the external casing;
   an axle mounted in the axle housing and drivingly engaged to the hydraulic motor; and
   a ring gear mounted between and separate from the motor housing and the axle housing, so that the external surface of the ring gear forms a part of the external casing for the assembly and;
   a port block mounted between the motor housing and the axle housing.

2. A hydraulic motor assembly as set forth in claim 1, wherein the external surface of the port block forms a part of the external casing for the assembly.

3. A hydraulic motor assembly as set forth in claim 1, further comprising a motor shaft engaged to the hydraulic motor and a gear train driven by the motor shaft, wherein the ring gear has an internal surface having a gear surface formed thereon, and at least part of the gear train runs on the gear surface.

4. A hydraulic motor assembly as set forth in claim 3, further comprising an opening formed in one end of the axle and a bearing mounted in the opening, and where the motor shaft extends into the opening and the axle is supported on the motor shaft through the bearing.

5. A hydraulic motor assembly as set forth in claim 3, wherein the gear train comprises a first planetary gear reduction set driven by the motor shaft.

6. A hydraulic motor assembly as set forth in claim 5, wherein the gear train further comprises a second planetary gear reduction set driven by the first planetary gear reduction set.

7. A hydraulic motor assembly as set forth in claim 6, where the first and second planetary gear reduction sets are both running on the gear surface of the ring gear.

8. A hydraulic motor assembly as set forth in claim 1, wherein the ring gear is sandwiched between the axle housing and the port block.

9. A hydraulic motor assembly as set forth in claim 1, further comprising a plurality of bolts connecting the axle housing to the motor housing.

10. A hydraulic motor assembly as set forth in claim 1, further comprising a motor shaft engaged to the hydraulic motor and a gear train driven by the motor shaft.

11. A hydraulic motor assembly as set forth in claim 1, wherein the port block is adjacent the hydraulic motor housing and the ring gear is adjacent the axle housing.

12. A hydraulic motor assembly as set forth iii claim 11, wherein the motor shaft extends from the motor housing through the port block into the ring gear.

13. A hydraulic motor assembly as set forth in claim 1, wherein the ring gear comprises tabs formed to engage the port block and the axle housing.

14. A hydraulic motor assembly comprising:
   a housing, a hydraulic motor mounted in the housing and having a motor shaft engaged thereto, the motor shaft having a first end and a second end;

a ring gear mounted in the housing;

a gear train forming part of the housing, wherein the gear train comprises a first planetary gear set rotating within the ring gear and driven by the motor shaft and a second planetary gear set rotating within the ring gear and driven by the first planetary gear set; and an axle shaft engaged to and driven by the second planetary gear set, the axle shaft having a first end located in the housing adjacent to one of the ends of the motor shaft and a second end extending out of the housing.

15. A hydraulic motor assembly as set forth in claim 14, wherein the external surface of the ring gear forms part of the housing.

16. A motor assembly comprising:

a motor housing;

a hydraulic motor mounted in the motor housing;

a motor shaft engaged to and driven by the hydraulic motor;

an axle housing secured to the motor housing;

a ring gear mounted between the axle housing and the motor housing;

a first planetary reduction gear set driven by the motor shaft and running on the ring gear;

a second planetary reduction gear set driven by the first planetary reduction gear set and running on the ring gear; and an axle mounted in the axle housing and drivingly engaged to the second planetary reduction gear.

17. A motor assembly as set forth in claim 16, further comprising a port block engaged to the motor housing.

18. A motor assembly as set forth in claim 17, wherein one end of the motor shaft is supported in the motor housing and the second end extends through the port block into the ring gear.

19. A motor assembly as set forth in claim 16, wherein the axle extends from within the ring gear to the exterior of the motor housing.

20. A motor assembly as set forth in claim 16, wherein one end of the axle is located in proximity to one end of the motor shaft.

21. A hydraulic motor assembly having an external casing, comprising:

a motor housing forming a part of the external casing and having a hydraulic motor mounted therein;

an axle housing secured to the motor housing and forming a part of the external casing;

an axle mounted in the axle housing and drivingly engaged to the hydraulic motor; and a ring gear and a port block mounted between the motor housing and the axle housing, so that the external surface of the ring gear forms a part of the external casing for the assembly and the axle is located entirely on one side of the port block and the motor cylinder block is located entirely on the opposite side of the port block.

* * * * *

UNITED STATES PATENT AND TRADEMARK OFFICE
CERTIFICATE OF CORRECTION

PATENT NO.    : 6,997,839 B1
DATED         : February 14, 2006
INVENTOR(S)   : Thomas J. Langenfeld, Raymond Hauser and Matthew C. Roney It is certified that error appears in the above-identified patent and that said Letters Patent is hereby corrected as shown below:

<u>Column 6,</u>
Line 60, delete "iii" and replace with -- in --.

Signed and Sealed this

Twenty-fifth Day of April, 2006

JON W. DUDAS
*Director of the United States Patent and Trademark Office*